United States Patent Office 3,441,291
Patented Apr. 29, 1969

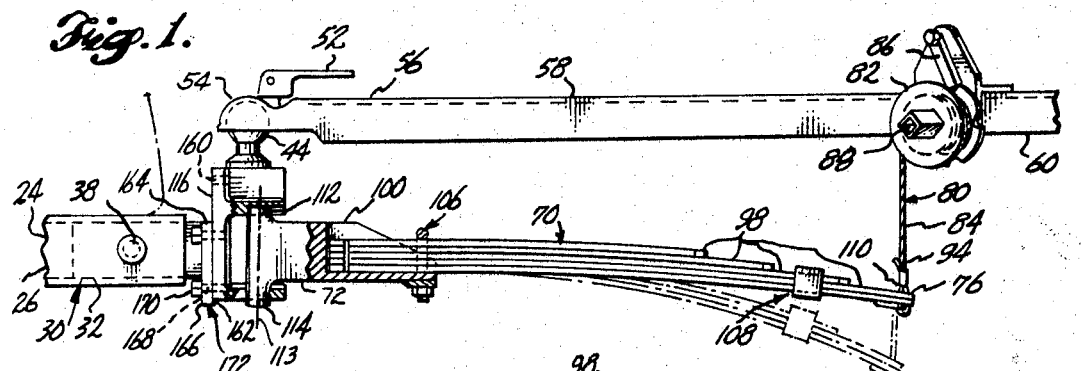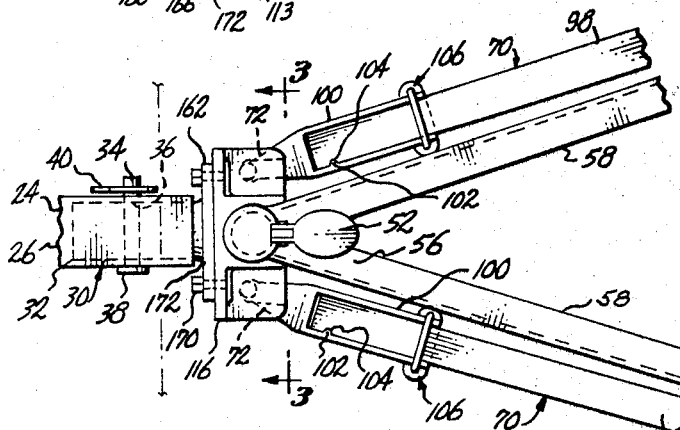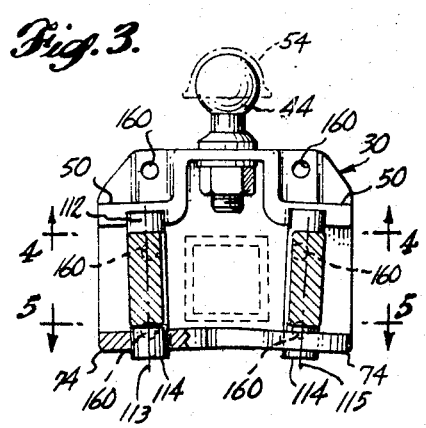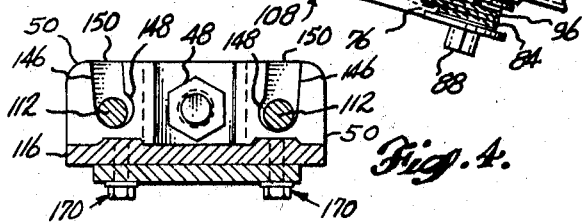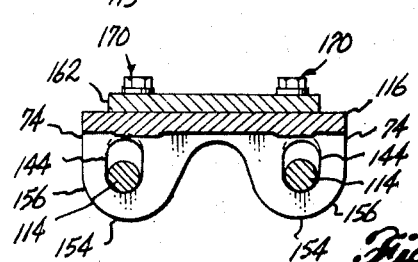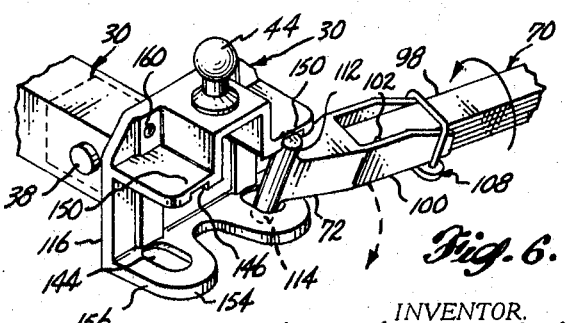
INVENTOR.
ALMA E. MORRIS, JR.
BY Roy Mattern Jr.
ATTORNEY

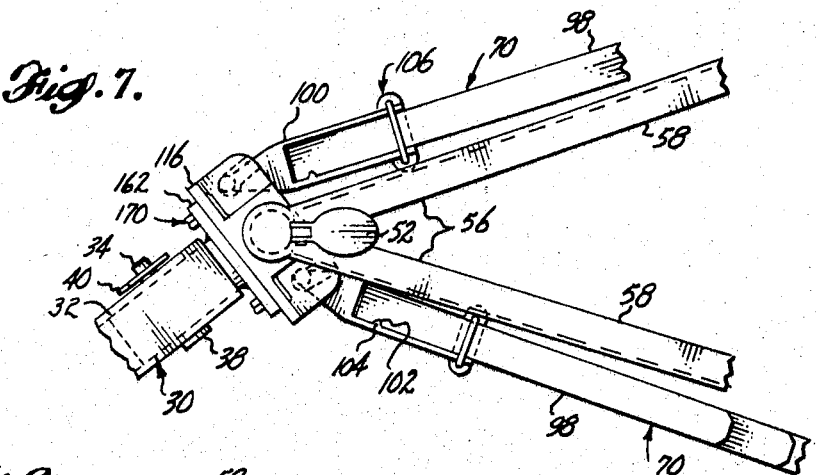
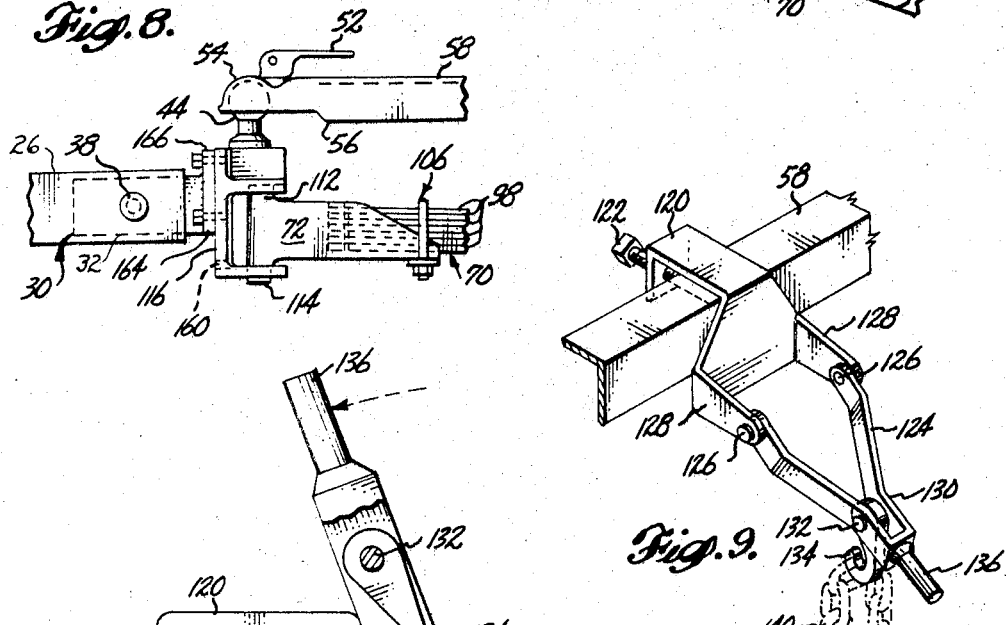
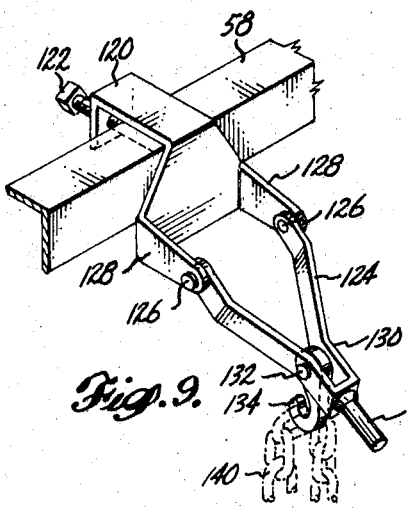
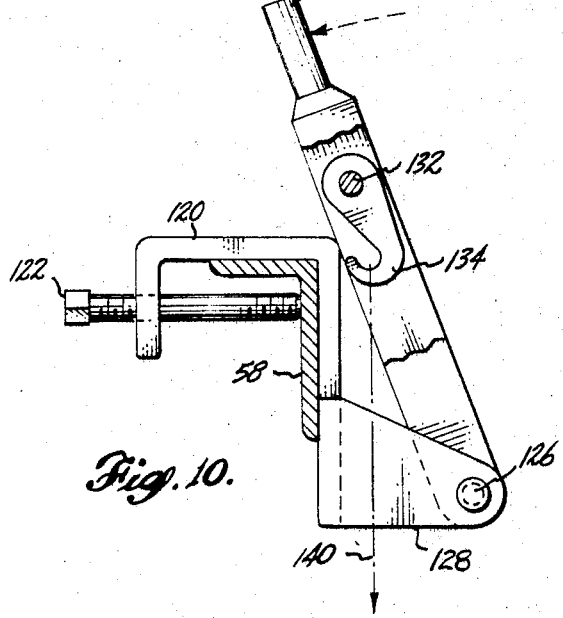

3,441,291
TRAILER HITCH
Alma E. Morris, Jr., 9810 Waller Road,
Tacoma, Wash. 98446
Continuation-in-part of application Ser. No. 477,705,
Aug. 6, 1965. This application May 11, 1967, Ser.
No. 637,805
Int. Cl. B60d; B62d 53/00
U.S. Cl. 280—406                     10 Claims

ABSTRACT OF THE DISCLOSURE

A trailer hitch is used to join a powered vehicle to a towed vehicle so a towed vehicle will track perfectly and will not unduly burden a powered vehicle, the hitching assembly resulting in: (1) substantial transfer of towed vehicle weight to forward wheels of a powered vehicle by using equalizing multiple leaf, initially reversed, spring arms which are adjustable in size and/or number to match current loading requirements; (2) substantial creation of beneficial non tipping and non swaying countering forces by using transverse offset pin axis mounting of forward ends of selective multiple leaf spring arms; (3) convenient, quick, and safe selective adjustments of tensile members connecting cantilevered ends of multiple leaf spring arms to V tongue structure of a towed vehicle; (4) convenient, quick and safe initially transverse tilting positioning of multiple spring arms to pivotally secure them to an interconnector which is so formed to thereafter securely retain their pin axis mounting ends whenever these spring arms are thereafter moved nearer the V tongue structure of a towed vehicle; and, (5) a three piece interconnector sub-assembly which provides at least four selective relative height adjustments to compensate for towed and powered vehicle vertical height variances in properly positioning a ball to receive a ball socket of a towed vehicle.

*Prior application*

This application continues in part my application for a Trailer Hitch filed Aug. 6, 1965, Ser. No. 477,705 and now abandoned.

*Prior art*

Trailer hitches now commonly referred to as "equalizing" hitches are set forth in many patents such as 2,817,541; 2,808,272; and 3,194,584. Mr. Terrell J. Reese, inventor named in the latter two patents, presented a technical paper at a Society of Automotive Engineers Regional Meeting in Toledo, Ohio on Apr. 13, 1964. He entitled his paper, "Engineering Principles of Weight-Equalizing and Sway Resistant Hitches." He directed his attention to the objectives of this technical session on the "Engineering Aspects of Travel Trailer Towing."

*Invention*

This invention concerns improvements made in extending this prior art. As set forth in the proceeding abstract there are at least five improvements which make this invention more effective in serving needs of all motorists who will be towing their camping trailers, boats and/or freight trailers over all types of roadways under initial different loading conditions which also may vary during a specific trip. These improvements are discussed under following headings after a discussion of accompanying drawings wherein:

FIGURE 1 is a side elevation of a trailer hitch, as attached to powered vehicle structure on the left and to towed vehicle structure on the right, dotted line indicating pre-loading downward curvative of a particular selected assembly of grouped leaf springs serving collectively as equalizing arms when coupled with their respective end securing means;

FIGURE 2 is a plan view of the trailer hitch as attached in FIGURE 1;

FIGURE 3 is a sectional view taken on line 3—3 of FIGURE 2;

FIGURE 4 is a sectional view taken on line 4—4 of FIGURE 3;

FIGURE 5 is a sectional view taken on line 5—5 of FIGURE 3;

FIGURE 6 is a perspective view of the interconnector showing, by using some dotted line, how grouped multiple leaf spring arms are secured into place;

FIGURE 7 depicts a hard over tuning status indicating how effective the pin receiving slots are on the interconnector;

FIGURE 8 indicates how the interconnector is made of multiple pieces to be adjusted to different height variations, the interconnector being shown in its next to maximum low position in contrast to its next to maximum high position shown in FIGURE 1; and also, in this FIGURE 8, it is shown how more leaf springs are conveniently added as more stringent load equalizing requirements are encountered;

FIGURES 9 and 10 indicate how a cable drum tensioning means of FIGURE 1 may be replaced by an over center swinging yoke means having a free swinging hook which receives a selected chain link of a chain employed to support the cantilevered end of a selected grouping of leaf springs, with FIGURE 9 showing the pre tension position and FIGURE 10 illustrating the tensioned position of these respective components.

*Basic equivalizing hitching connections*

As is done in securing powered vehicles to vehicles to be towed wherein equalizing load advantages are to be realized, as shown in FIGURES 1 and 3, framing of powered vehicle is generally strengthened and extended 24 to the rear, terminating in a hollow draw bar 26 of square or rectangular cross section. An interconnector 30, previously called by others by various names and made in several ways is then connected to this draw bar 26 by using its forward portion 32, which fits complementary into the hollow draw bar 26 and to be held in place by a large shear pin 34 which passes through both members when inserted through their aligned grouping 36 of holes. Shear pin 34 is held, thereafter, in place by its head 38 and clip pin 40.

Interconnector 30 supports atop its center, a ball connector 44 which is bolted in place as nut 46 is tightened against both washer 48 and top flange 50 of interconnector 30. Ball connector 44 receives ball socket 54 which is permanently secured to apex 56 of V tongue structure 58 which is part of framing of a towed vehicle, as shown in FIGURES 1 and 2. Ball socket 54 is locked over ball connector 44 by using locking mechanism 52.

When a connection between a powered vehicle and a towed vehicle is first completed by interconnecting them with ball connector 44 and ball socket 54, no equalization is occurring and the rear of powered vehicle is depressed as V tongue structure 58 of towed vehicle moves downward until the resistance, primarily of the powered vehicles rear suspension system is fully encountered.

Then to acquire basic equalization, or nearly so, to shift towed vehicle weight both back on the towed vehicle wheels and forward to the front wheels of the powered vehicle, paired spring arms 70 are first pivotally connected at their forward ends 72 to interconnector 30, respectively, just to the right and left of ball connector 44 and between its top 50 and bottom 74 flanges. Thereafter spring arms 70 are raised to approach equalization of the loading between vehicles. Spring arms 70 are held in such raised position by tension members 80 which are adjustably secured to V tongue structure 58 of towed vehicle by a means, shown in this invention in FIGURES 1 and 2 as a cable drum, 82, cable 84, ratchet 86 and crank pin 88, clamped into place by clamp 90 with its securing pin 92. As known and observed, raising of spring arms 70, transfers the effect of towed vehicle weight, shifting some of the weight to forward wheels, not shown, of powered vehicle. As a result, both vehicles become closer to their longitudinal level position and handling of the connected vehicles is much improved through this equalizing hitching connection.

Selective grouping of multiple leaf, initially reversed spring arms

The improvement of this invention which is directed to making a selected trailer hitch adaptable to finer adjustments to match changing equalization requirements centers on selective grouping of multiple leaf, initially reversed spring arms. As shown in FIGURES 1 and 8, either fewer or more leaf springs 98 may be grouped together. The grouping includes leaf springs of different lengths and could include leaf springs of different cross sections, not shown. To make a changeover convenient, pivotally secured forward ends 72 of spring arms 70 are each formed with receiver 100 having a side wall projection, rib or ridge 102. Into this receiver 100, a selective grouping of leaf springs 98, each with a notch 104 are dropped into place. They are then clamped by clamping assemblies 106 and 108. Generally the bottom two leaf springs 98 of any group remain. They have together an anchoring fastening assembly 110 at their cantilever ends which serve as the cantilevered rear end 76 of each spring arm 70. The anchoring fastening assembly 110 receives the tensioning members 80. The pivoting forward ends 72 of spring arms 70 each have a pivoting axis which is substantially perpendicular to the longitudinal direction of their respective receivers 100. Also these forward ends 72 are an integral part of their associated receiver structures 100 into which leaf springs 98 are secured.

Transverse offset pin axis mounting of spring arms

As noted before and illustrated in FIGURE 1, the pivotal axis of each forward end 72 of a spring arm 70 is substantially perpendicular to the longitudinal direction of its receiver 100. However, after assembly of spring arms 70 with interconnector 30, top and bottom integral pins 112 and 114, of pivoting forward ends 72, determine an axial direction, as indicated by dot-dash line 13 which is not perpendicular with upright transverse body portion 116 of interconnector 30 in side elevation as viewed in FIGURE 1. Nor is this resulting axial direction of pins 112 and 114 perpendicular to bottom transverse flange 74 of interconnector 30 as viewed in FIGURES 2 and 3. The axis line 113 of pins 112, 114 on the left forward end 72, as shown in FIGURES 1 and 3, as it extends upwardly, also tilts both outwardly and rearwardly. The axis line 115 of pins 112, 114 on the right forward end 72, as shown in FIGURE 3 and indicated indirectly in FIGURE 1, as it extends upwardly, also tilts both outwardly and rearwardly.

The transverse tilting axis created force component serves to create a favorable moment of force during turning as indicated by the positioning of spring arms 70 in FIGURE 7. Cantilevered end 76 of spring arm 70 located on the inside of the turn is moved downward as spring arm 70 pivots about this tilting axis mounting in interconnector 30. Its downward movement results in the creation of a pulling force through its tension member 80 which is effective, through its attachment to V tongue structure 60, to favorably tilt towed vehicle 62 and powered vehicle 22 into the turn that is occurring as illustrated in FIGURE 7.

The longitudinal tilting axis created force component may be omitted and the transverse tilting axis created force component may be sufficient to effectively produce this beneficial tilting or banking during a turn. However, longitudinal tilting axis created force may be helpful in certain installations. Also, longitudinal tilting initially positions cantilevered ends 76 lower to ground level leaving a greater available length of a tensioning member 80 between spring arm end 76 and V tongue structure 58 for adjustment to create more effective load equalizing forces.

The transverse tilting axis created force component in addition to effectively creating wanted tilting and banking on a curve is constantly available and is being utilized to monitor any unintended swaying tendencies during all operations including straight away towing.

Tightening and securing tension members supporting cantilevered ends of spring arms to create equalizing forces Two embodiments of respective improvements in securing cantilevered ends 76 of spring arms 70 are illustrated. In FIGURES 1 and 2, a cable 84 and cable drum 82 means is shown. Lower cable end 94 is attached to anchoring fastener assembly 110 and upper cable end 96 is secured to cable drum 82. The latter is inturn made integral with clamp 90 which is secured by its pin 92 to V tongue structure 60. An equalizing force is created and determined by rotating a cable drum 82 to shorten the effective length of cable 84, which shortening raises cantilevered end 76 of spring arm 70. Once an equalization force is determined, ratchet 86 locks cable drum 82. Rotation of cable drum 82 is preferably undertaken by using a crank, not shown, which is fitted to crank pin 88 during take up of cable 84.

The other embodiment of an improved way of securing cantilevered ends 76 of spring arms 70 is illustrated in FIGURES 9 and 10. A clamp 120 is secured by pin 122. Then to the outer lower side of clamp 120, a yoke 124 is pivotally mounted, by using pins 126, to outwardly and horizontally extending paired and spaced bearing and receiving members 128. The swinging portions of yoke 124, as they converge, form a receiving structure 130 to accommodate a hook 134 which is pivotally mounted to receiving structure 130 by using pin 132. Receiving structure 130 is thereafter continued and converged to form a handle 136. A chain 140 is used as tension member 80. It is secured to anchoring fastening assembly 110 located at cantilevered end 76 of spring arm 70. Thereafter during equalization manipulations a selected chain link is positioned over the freely pivotal hook 134. Then yoke handle 136 is rotatively moved into its secured, tightened, over center, self-locking position as illustrated in FIGURE 10.

Cooperating interconnector structural portions that effectively and conveniently receive forward ends of spring arms and then securely retain them after their slight pivotal movement in a direction from an initially transverse position toward the tongue structure of the towed vehicle As illustrated in FIGURES 4, 5 and 6, top and bottom flanges, 50 and 74, of interconnector 30 are formed with recesses to receive top and bottom pins 112 and 114 of spring arms 70. The bottom flange 74 has recesses 144 that are oblong in the direction of the longitudinal axis. The top flange 50 has oblong recesses 146 arranged in the same longitudinal direction. At their forward end they include an outwardly, offset radial structure 148 forming a space which serves to receive and capture a top pin 112 on a spring arm 70 when it is located on the inside of a turn. Also oblong recesses 146 continue rearwardly and are not closed. However, they are capped above by structure 150 which likewise is not closed to the rear. Capped structure 150 controls location of top pin 112 so it alone sustains wear and not forward spring end 72.

Both top and bottom flanges 50 and 74 are deeper at 154 in their longitudinal direction rearwardly of their restrictive oblong recesses 144, 146 than they are extended outwardly in a transverse direction at 156 from their oblong recesses 144, 146. Such deeper structure insures complete retention of top and bottom pins 112 and 114 and consequently the continued retention of spring arms 70 once they are moved toward V tongue structure 58 after being conveniently installed.

The ease of initial installation and also the ease of intended removal of spring arms 70 is illustrated in FIGURE 6. In hooking up, spring arms 70 are positioned transversely and then tilted so lower pin 114 of each respective arm 70 may be inserted in a respective oblong recess 144 of bottom flange 74. After such insertion, each spring arm 70 is tilted or rocked back upright while remaining in a transverse position. In so doing, top pin 112 enters open end of top oblong recesses 146 of top flange 50. With these pins 114 and 112 in oblong recesses 144 and 146, each spring arm 70 is moved toward V tongue structure. Thereafter each spring arm 70, securely remains connected until rotated back transversely, tilted by a rocking motion and lifted clear in a reverse sequence of the installation steps. This installation and removal sequence is aided by downwardly sloping bottom flange 74 outwardly beyond oblong recesses 144 at 156.

As will be realized, under towing loads, portions of top flange 50 located at the forward end of oblong recesses 146 and portions of bottom flange 74 located at the rear of oblong recesses 144 will sustain the greatest loading. Both of these flanges are therefore strongly constructed in these locations to effectively handle the transmittal of these equalizing forces. This lower flange 74 which is enlarged and strengthened to receive this loading, also when enlarged, serves to captively retain bottom pin 114 of spring arm 70 under all towing conditions in a way which also causes retention of top in 112 in its restrictive structural environment.

*Multiple piece interconnector with selective bolted positions to accommodate changes in relative heights between towed and powered vehicles*

Very often a motorist having his powered vehicle fitted with an equalizer hitch is confronted with a problem of changing the relative height position of ball connector 44 to accommodate a ball socket 54 of a different towed vehicle or perhaps his same towed vehicle which has been altered in height by weight changes, tongue changes and/or perhaps wheel and/or tire changes. To provide a convenient, quick adjustment in these relative heights, interconnector 30 is made with respective sections that may be bolted together in selective different combinations. Resulting selected positions are illustrated in FIGURES 1 and 8 wherein effective height changes may be compared.

To accomplish these adjustments, upright transverse body 116 of interconnector 30 has three paired sets of holes 160. Two pairs are utilized at any one time in bolting on forward hollow portion 32 by utilizing its integral transverse plate flange 162. This flange 162 is flush with hollow portion 32 at one location 164 and extends beyond it at another location 166. Two paired sets of holes 168 are utilized in bolting flange 162 to transverse body 116 when they are joined together by using bolt-nut-washer fastener assemblies 170. In addition to this selection of using two sets of holes 160 from the available three sets in body 116 to position ball connector 44, the entire unit 172, composed of hollow portion 32 and flange 162, may be inverted to gain additional variable height adjustments. In the embodiment illustrated in FIGURES 1 and 8, four selected relative height adjustments are made available to a motorist.

*Summary*

This invention provides, in combination, many components, which collectively offer a motorist a trailer hitch which is easily installed and thereafter conveniently and quickly adjusted. At all times the invention performs equalizing load functions in better ways. For example, there is a constant sway control. Also, on turns the vehicles have a tendency to bank favorably into the turns. These structural and functional aspects of the invention have been discussed previously in the description and they are set forth in the following claims.

I claim:

1. A trailer hitch adapted to conveniently and quickly join a powered vehicle to a towed vehicle and in so doing readjust the involved weight distributions by utilizing equalizing structural components which also help to regulate swaying tendencies and to create favorable banking of the joined vehicles during turns, comprising:
   (a) a draw bar adapted to be connected to framing extensions of a powered vehicle;
   (b) an interconnector made in multiple pieces having, a forward portion to fit into the draw bar and to be secured thereto, two adjacent transverse members to be bolted together, one being made integral with the forward portion and the other forming an upright body having top and bottom flanges adapted to receive in their own flange holes connector axis pins of spring arms and the top flange also being adaptable to supporting a ball connector;
   (c) a ball connector adaptable to be bolted to the top flange of the interconnector;
   (d) a ball socket adaptable to be secured to the apex of a V tongue structure of a towed vehicle and removably fitted and locked over the ball connector;
   (e) spring arms adapted for pin mounting of their forward ends to the interconnector and for tensioned support of their cantilevered rear ends by a tension member of an adjustable tensioning assembly which is adapted to be controlled and supported from a location on V tongue structure of the towed vehicle; and
   (f) an adjustable tensioning assembly to secure its tension member between itself at the V tongue structure and the cantilevered ends of the spring arms at one end, a cable for attachment to the spring arms at one end, a cable drum to receive the adjustable end of the cable, a rachet to keep the cable drum from unintentional unwinding, a crank pin on the drum to receive a crank during its take up rotations.

2. A trailer hitch adapted to conveniently and quickly join a powered vehicle to a towed vehicle and in so doing readjust the involved weight distributions by utilizing equalizing structural components which also help to regulate swaying tendencies and to create favorable banking of the joined vehicles during turns, comprising:
   (a) a draw bar adapted to be connected to framing extensions of a powered vehicle;
   (b) an interconnector made in multiple pieces having, a forward portion to fit into the draw bar and be secured thereto, two adjacent transverse members to be bolted together, one being made integral with the forward portion and the other forming an upright body having top and bottom flanges adapted to receive in their own flange holes connector axis pins of spring arms and the top flange also being adaptable to supporting a ball connector;
   (c) a ball connector adaptable to be bolted to the top flange of the interconnector;
   (d) a ball socket adaptable to be secured to the apex of a V tongue structure of a towed vehicle and removably fitted and locked over the ball connector;
   (e) spring arms adapted for pin mounting of their forward ends to the interconnector and for tensioned support of their cantilevered rear ends by a tension member of an adjustable tensioning assembly which is adapted to be controlled and supported from a location on V tongue structure of the towed vehicle; and
   (f) an adjustable tensioning assembly to secure its tension member between itself at the V tongue structure and the cantilevered ends of the spring arms including a chain as the tension member, a pivoting yoke assembly for over center locking operation mounted to a V tongue structure of a towed vehicle, the pivoting yoke supporting a pin mounted swingable hook which engages a selected chain link during adjustable tensioning of the chain to position the spring arms in establishing equalizing forces.

3. A trailer hitch adapted to conveniently and quickly join a powered vehicle to a towed vehicle and in so doing readjust the involved weight distributions by utilizing equalizing structural components which also help to regulate swaying tendencies and to create favorable banking of the joined vehicles during turns, comprising:
  (a) a draw bar adapted to be connected to framing extensions of a powered vehicle;
  (b) an interconnector made in multiple pieces having, a forward portion to fit into the draw bar and be secured thereto, two adjacent transverse members to be bolted together, one being made integral with the forward portion and the other forming an upright body having top and bottom flanges adapted to receive in their own flange holes connector axis pins of spring arms and the top flange also being adaptable to supporting a ball connector wherein the said two adjacent transverse members of the interconnector are provided with respective multiple pairs of holes in more combinations than are needed at one time, so that pairs of holes are aligned to acquire different relative heights between these transverse members and consequently thereby variably positioning the height of the said ball connector to accommodate different frame heights of towed and power vehicles.
  (c) a ball connector adaptable to be bolted to the top flange of the interconnector;
  (d) a ball socket adaptable to be secured to the apex of a V tongue structure of a towed vehicle and removably fitted and locked over the ball connector;
  (e) spring arms adapted for pin mounting of their forward ends to the interconnector and for tensioned support of their cantilevered rear ends by a tension member of an adjustable tensioning assembly which is adapted to be controlled and supported from a location on V tongue structure of the towed vehicle; and
  (f) an adjustable tensioning assembly to secure its tension member between itself at the V tongue structure and the cantilevered ends of the spring arms.

4. A trailer hitch adapted to conveniently and quickly join a powered vehicle to a towed vehicle and in so doing readjust the involved weight distributions by utilizing equalizing structural components which also help to regulate swaying tendencies and to create favorable banking of the joined vehicles during turns, comprising:
  (a) a draw bar adapted to be connected to framing extensions of a powered vehicle;
  (b) an interconnector made in multiple pieces having, a forward portion to fit into the draw bar and be secured thereto, two adjacent transverse members to be bolted together, one being made integral with the forward portion and the other forming an upright body having top and bottom flanges adapted to receive in their own flange holes connector axis pins of spring arms and the top flange also being adaptable to supporting a ball connector, the said flange holes in the top and bottom flanges being formed as oblong slotted holes in the bottom flange and open end oblong slotted holes in the top flange, the top flange holes being positioned rearwardly and outwardly with respect to the holes in the bottom flange, this relative positioning being utilized for more convenient assembly of the trailer hitch, for better retention, after assembly and for better turn and sway control after assembly, the convenient assembly being undertaken as the spring arms approach from a transverse aligned direction while they are tilted and rocked so their lower pin will first enter the bottom oblong slotted hole and thereafter their top pin will enter into the top open end oblong slotted hole as the spring arms are tilted back up and subsequently as the cantilevered spring arms are rotated toward V tongue structure of a towed vehicle the pins and consequently the spring arm are captively but adjustably retained until once again the spring arms are rotated to a transverse position and then tilted and lifted out;
  (c) a ball connector adaptable to be bolted to the top flange of the interconnector;
  (d) a ball socket adaptable to be secured to the apex of a V tongue structure of a towed vehicle and removably fitted and locked over the ball connector;
  (e) spring arms adapted for pin mounting of their forward ends to the interconnector and for tensioned support of their cantilevered rear ends by a tension member of an adjustable tensioning assembly which is adapted to be controlled and supported from a location on V tongue structure of the towed vehicle; and
  (f) an adjustable tensioning assembly to secure its tension member between itself at the V tongue structure and the cantilevered ends of the spring arms.

5. A trailer hitch, as claimed in claim 4, wherein the said bottom flange of the said interconnector slopes downwardly in a transverse direction from the center of the interconnector to accommodate the transverse and tilting motion of the spring arms during their installation and to thereafter insure against their withdrawal after their rotation toward V tongue structure of a towed vehicle 6. A trailer hitch, as claimed in claim 4, wherein the said oblong slotted hole in the top flange has a captive offset radial recessed structure at its forward end to fully capture a top pin of a spring arm as it becomes the inside spring arm during a turn.

7. A trailer hitch adapted to conveniently and quickly join a powered vehicle to a towed vehicle and in so doing readjust the involved weight distributions by utilizing equalizing structural components which also help to regulate swaying tendencies and to create favorable banking of the joined vehicles during turns, comprising:
  (a) a draw bar adapted to be connected to framing extensions of a powered vehicle;
  (b) an interconnector made in multiple pieces having, a forward portion to fit into the draw bar and to be secured thereto, two adjacent transverse members to be bolted together, one being made integral with the forward portion and the other forming an upright body having top and bottom flanges adapted to receive in their own flange holes connector axis pins of spring arms and the top flange also being adaptable to supporting a ball connector, the said flange holes of said top and bottom flanges being aligned to receive said top and bottom pins of the said spring arms along a resulting pivotal axis on each side of the interconnector, which axis, in a transverse direction, tilts outwardly at its top, and therefore during a turn, a spring arm as it becomes the inside spring arm creates a force which tilts and banks the vehicles into the turn, and also at all times each spring arm constantly and effectively provides sway control with either spring arm ready to dampen oscillations.
  (c) a ball connector adaptable to be bolted to the top flange of the interconnector;
  (d) a ball socket adaptable to be secured to the apex of a V tongue structure of a towed vehicle and removably fitted and locked over the ball connector;
  (e) spring arms adapted for pin mounting of their forward ends to the interconnector and for tensioned support of their cantilevered rear ends by a tension member of an adjustable tensioning assembly which is adapted to be controlled and supported from a location on V tongue structure of the towed vehicle; and (f) an adjustable tensioning assembly to secure its tension member between itself at the V tongue structure and the cantilevered ends of the spring arms.

8. A trailer hitch adapted to conveniently and quickly join a powered vehicle to a towed vehicle and in so doing readjust the involved weight distributions by utilizing equalizing structural components which also help to regulate swaying tendencies and to create favorable banking of the joined vehicles during turns, comprising:

(a) a draw bar adapted to be connected to framing extensions of a powered vehicle;

(b) an interconnector made in multiple pieces having, a forward portion to fit into the draw bar and to be secured thereto, two adjacent transverse members to be bolted together, one being made integral with the forward portion and the other forming an upright body having top and bottom flanges adapted to receive in their own flange holes connector axis pins of spring arms and the top flange also being adaptable to supporting a ball connector, the said flange holes of said top and bottom flanges being aligned to receive said top and bottom pins of the said spring arms along a resulting pivotal axis on each side of the interconnector, which axis, in a longitudinal direction tilts downwardly at its top and at the time in a transverse direction tilts outwardly at its top, and therefore during installation of the spring arms each arm is initially positioned with its cantilevered end quite low permitting its equalizing adjustment while still leaving a substantial effective length of a tensioning member between its end and V tongue structure of a towed vehicle, and also therefore positioning a spring arm, as it becomes the inside spring arm during a turn, so that it effectively creates a force which tilts and banks the vehicles into the turn, and also at all times each spring arm is constantly and effectively providing sway control as oscillations are dampened.

9. A trailer hitch adapted to conveniently and quickly join a powdered vehicle to a towed vehicle and in so doing to readjust the involved weight distributions by utilizing equalizing structural components which also help to regulate swaying tendencies and to create favorable banking of the joined vehicles during turns, comprising:

(a) an interconnector with means for attachment to a vehicle through the vehicle's means such as draw bar, means for attachment to spring arms, means for attachment to a ball connector and ball socket assembly and means for adjustably changing the relative height between its means for attachment to a ball connector and its means for attachment to a powered vehicle through a powered vehicles means such as a draw bar;

(b) an assembly of a ball connector and ball socket with the ball connector adapted to be secured to the interconnector and the ball socket adapted to be secured to the tongue of a towed vehicle;

(c) spring arms adapted to be pivotally secured at their forward ends on their axes to respective connection means on the interconnector and adapted to be secured to a tensioning means located at each of their rear cantilevered ends, the spring arms between their forward and rear ends being substantially made of a selected grouping of leaf springs which are ever ready to be conveniently regrouped by substitutions, additions, and subtractions of leaf springs to match changing equalizing requirements; and (d) an adjustable tensioning means adapted to connect the rear cantilevered ends of the spring arms to a tongue of a towed vehicle.

10. A trailer hitch, as claimed in claim 9, wherein the said leaf springs of the said spring arms are initially reversed downwardly in their curvature so that upon their loading there remains sufficient capacity after adjustment of the said tensioning means.

References Cited

UNITED STATES PATENTS

| 2,597,657 | 5/1952 | Mathisen | 280—406 |
| 2,793,879 | 5/1957 | Bair | 280—406 |
| 2,898,124 | 8/1959 | Bernard et al. | 280—406 |
| 2,906,544 | 9/1959 | Watts | 280—406 |
| 3,220,749 | 11/1965 | Mathisen | 280—406 |

FOREIGN PATENTS 937,656   9/1963   Great Britain.

LEO FRIAGLIA, *Primary Examiner.*

U.S. Cl. X.R.

280—489, 490